Sept. 11, 1956

I. BERMAN 2,762,953

CONTACT RECTIFIERS AND METHODS

Filed May 15, 1951

INVENTOR
IRVIN BERMAN
BY Paul S Martin
ATTORNEY 2,762,953
Patented Sept. 11, 1956

2,762,953

CONTACT RECTIFIERS AND METHODS

Irvin Berman, Swampscott, Mass., assignor to Sylvania Electric Products Inc., a corporation of Massachusetts Application May 15, 1951, Serial No. 226,437
6 Claims. (Cl. 317—234)

The present invention relates to contact rectifiers and, more particularly, to rectifiers employing germanium as a semi-conductor, and also to methods of their manufacture.

Germanium has been employed heretofore as a rectifier in widespread commercial use in a form where the germanium has one large area of connection and a rectifying contact in the form of a sharp ended wire in pressure engagement with the germanium. In such rectifiers, there is a very high current density at the point of contact but the maximum rectified current has generally been well below one hundred milli-amperes when the drop across the rectifier in the forward direction is limited to not more than a few volts. An object of this invention is to improve germanium rectifiers to the end that much heavier rectified currents can be realized. A further purpose of the invention is to provide a novel form of rectifier wherein the unit area pressure of the rectifying contact is not intense as in the case of the sharp ended contact, but, instead, employs a contact of the so-called area type. In this respect, the novel form of rectifier is comparable to copper oxide and selenium rectifiers of the area type that have been known heretofore.

In the illustrative disclosure given below, germanium is used in a highly purified form. This contrasts with germanium that is normally used for point-contact rectifiers since, in the latter, germanium is deliberately "doped", i. e., the germanium is melted with an additional substance such as a doping gas or a limited percent of a doping metal which renders the germanium a doped N-type semi-conductor. In the novel area rectifiers, tin-doped germanium as an example of an N-type semi-conductor yields rectifiers of poor rectification efficiency.

In this illustrative disclosure, highly purified germanium is used in area contact with a metal of group III in the periodic chart and, specifically, thallium and indium impart high forward conductivity. These metals, indium and thallium, have the further properties of being solid at normal temperatures and fuse to form an intimate surface contact with the germanium by electrical heating of the rectifier in operation.

The nature of the invention and further features of novelty and purposes will be better appreciated from the following detailed disclosure considered with the accompanying illustrative drawings.

Figure 1:
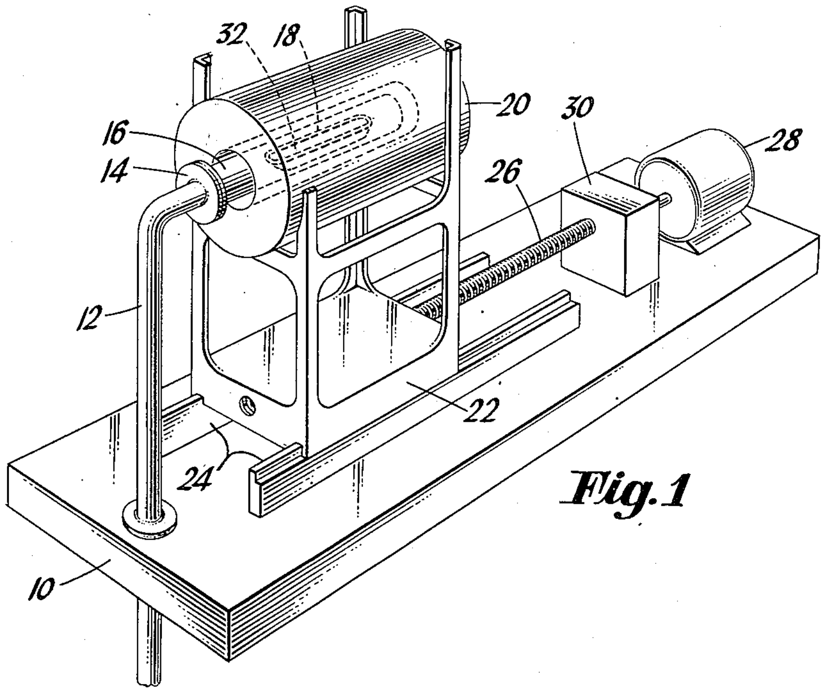
Figure 1 is typical furnace arrangement employed in preparing undoped germanium suitable for the novel rectifiers.

It has been stated that germanium suitable for the purposes of this invention is highly purified, and in particular, germanium that has not been doped in a way to make it N-type germanium. Germanium in suitable state can be obtained by reducing commercially pure germanium oxide (such as is supplied by Eagle-Picher Company) in a hydrogen atmosphere to yield finely divided metallic germanium. This is next formed into an ingot in a furnace such as appears in Figure 1. This furnace includes a support 10 which rigidly carries a glass tube 12 connected by a gasket and hermetic seal 14 (as of silicone rubber) to a quartz chamber 16. Within this quartz chamber, a long and slender graphite boat 18 is supported, containing a charge of finely divided germanium as previously described. It is not necessary that the germanium be in finely divided state at this time, but portions of a melt of similar germanium previously made from such commercially pure oxide can equally well be used.

Externally of chamber 16, there is provided a furnace unit 20 conveniently formed with a tungsten wire heating coil (not shown) nearest chamber 16 and with a heat insulating cover. This furnace is supported for traveling axially, i. e., horizontally in relation to chamber 16. The structure supporting the heating coil includes a block 22 on a pair of slide bearings 24 and threaded shaft 26 is provided engaging an internally threaded portion of block 22. Motor 28 drives shaft 26 through reduction gear unit 30.

Figure 1A:
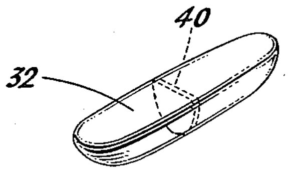
Figure 1*a* is a typical ingot produced by such furnace.

The furnace can be operated to produce a desirable ingot 32 by first evacuating chamber 16 to about 12 microns of internal pressure by means of a vacuum pump (not shown) and by heating the germanium to its melting point, or somewhat above, for a period of approximately one hour. Thereafter, while the furnace temperature is maintained, motor 28 is operated to withdraw the furnace gradually toward the right in Figure 1 at the rate of perhaps one inch per hour. The length of chamber 16 is approximately 6 inches in an example so that the furnace would be wholly removed in about 6 hours. The length of the boat and the resulting ingot may be no more than 2 to 3 inches. During the final part of the furnace withdrawal, the heating actually may be outside the range of the carbon boat and the ingot has started to cool gradually. After the motor has completed the furnace withdrawal, the ingot is allowed to cool gradually over an additional period of 12 hours under vacuum. The result is believed to be a large single crystal, or ingot, shown in Figure 1*a*, in which residual traces of impurities are thought to migrate to the opposite ends, leaving different portions of germanium, predominantly P-type, but characteristically of high resistivity (as compared to tin-doped germanium).

The foregoing disclosure of the manner of preparing purified germanium ingots is not novel and is given as background material to help identify germanium found effective for the purposes of this invention. In contrast to doped germanium that may contain about 0.1% of a doping constituent, the pure germanium here contemplated is free of impurities except traces detectable spectroscopically, and a few parts of impurities in one million parts of germanium can in general be tolerated. No claim is made to the apparatus or the foregoing processes per se, all of this being well known; and while the horizontal type of furnace is shown, the conventional vertical vacuum furnace can be similarly operated for like results.

Roughly semicircular slices of perhaps ¾ inch width and 0.018 inch thickness are next obtained by transverse cuts with a diamond cutting wheel. These slices are next advantageously plated on one surface, as with copper, for effecting a good electrical area contact, i. e., an ohmic contact and, on the opposite surface polished in a conventional manner and etched as with the well-known aqueous solution of hydrofluoric and nitric acids with a small quantity of cupric nitrate. Other etching and polishing solutions can be used such as those disclosed in patent application No. 106,493 filed by Fredric Koury, now abandoned. These slices may be used in their full size or they may be cut into smaller dice.

Figure 2:
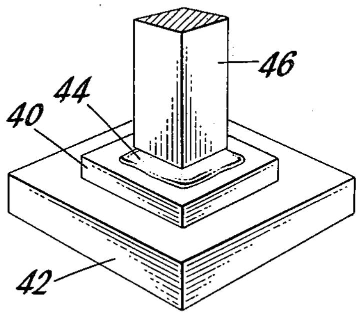
Figure 2 is a diagrammatic illustration of a typical rectifier embodying features of the invention.

Figure 2 illustrates a germanium rectifier embodying features of the present invention and in this figure, the piece 40 of germanium obtained as described above is supported on a metallic contact 42 and engaged on its opposite surface by a layer or film 44 of certain metals, namely, a metal or alloy of such metal of group III and preferably a metal of the group consisting of indium and thallium. Engaging area contact 44 with moderate pressure is a circuit contact 46 of any convenient material and any desirable form. In the illustration, the contact 44 covers most of the top area of the germanium. A contact 42 whether plated on the germanium or merely in engagement, is of a suitable metal such as brass, nickel-iron alloys including Kovar, nickel, copper, lead-tin solder, and antimony. The latter is particularly effective in imparting a high back resistance to the rectifier, thus greatly improving its efficiency.

It is possible to obtain rectification at high levels of current even when using indium on both surfaces of a slice of germanium obtained as above but not plated with copper as described. From this, it is deduced that the crystalline character of the germanium is a factor influencing the rectification. This is further substantiated by the following observation. When the indium, for example, has been applied to one surface of an unplated slice of germanium supported in turn by a different metal, and if a relatively poor rectification characteristic is obtained, the indium can be physically peeled from the germanium slice and applied to the opposite surface of the germanium slice which, when connected in a circuit, is then frequently found to rectify efficiently and to pass high currents.

When the rectifier is assembled properly in the form shown in Figure 2, and various voltages are applied, it is found that only a few milli-amperes are passed by a rectifier having an 0.05 inch square piece of germanium in the "back" high-resistance direction for applied peak voltages up to 40 volts, whereas at only a few volts in the forward direction, currents of a few hundred milli-amperes flow, the current naturally depending substantially on the value of any load resistance used. These rectifiers are capable of rectifying short-time bursts of alternating currents up to two amperes or more, without cooling. During operation the layer 44 fuses due to heating. As the voltage drop across the rectifier rises, the resistance and rectification property of the rectifier abruptly drops and very high values of current flow thereafter. Good rectification efficiency is regained upon cooling except when heavy overload is imposed. The exact current level at which fusion of the indium occurs is not definite but there is no doubt that fusion does take place and a bond is formed between layers 40 and 44. An overload-damaged rectifier can often be restored to operation merely by stripping the indium and substituting another indium contact.

It is not necessary that layer 44 as of indium be of any great thickness and, in fact, a thickness beyond about .01 inch introduces excessive resistivity and limits the operative range of the rectifier to a value substantially below the 40 volt limit reached for thinner layers of indium. Also, the thickness of the germanium is a factor to be considered because excessive thickness reduces the efficiency whereas a layer that is too thin is mechanically difficult to handle. The germanium layer of .018 to .020 inch thickness gives excellent results. It is not certain that the indium or other material used as layer 44 or an alloy containing such metal is in physical contact with the germanium, but instead, it is possible that a surface layer of oxide on the indium, or the like, is formed as an interposed barrier between this layer 44 and the germanium. Nonetheless, irrespective of the nature of the barrier that may exist in the germanium or between the indium and the germanium, the layer 44 is designated an area contact.

It should be recognized that the foregoing disclosure is illustrative. From this disclosure there will be suggested to those skilled in the art various substitutes, modified arrangements, and varied applications. It is, therefore, appropriate that the appended claims be accorded that latitude of interpretation that is consistent with the spirit and scope of the invention.

What is claimed is:

1. A contact rectifier including a layer of germanium having an ohmic contact and a layer of metal of group III on the germanium.

2. A contact rectifier including a layer of germanium having an ohmic contact and a layer containing metal of the group consisting of thallium and indium on the germanium.

3. An area rectifier including a layer of highly purified germanium, a layer of metal of group III on one surface of the germanium, and an area contact on the opposite surface of the germanium of a material different from said layers.

4. An area rectifier including a layer of highly purified germanium, a layer of the group consisting of thallium and indium on one surface of the germanium, and an area contact on the opposite surface of the germanum of a material different from said layers.

5. A rectifier of the area type including a layer of highly purified germanium of approximately .019 inch thickness having on one surface thereof an indium layer of less than .01 inch thickness and an area contact on the opposite surface thereof of a metal different from the aforementioned metals.

6. An area rectifier including a thin layer of undoped high resistivity germanium having area contacts on both surfaces thereof, one of said contacts being a metal of the group consisting of indium and thallium.

References Cited in the file of this patent

UNITED STATES PATENTS

| | | |
|---|---|---|
| 2,246,161 | Adenstedt et al. | June 17, 1941 |
| 2,361,157 | Thompson et al. | Oct. 24, 1944 |
| 2,380,880 | Thompson et al. | July 31, 1945 |
| 2,530,110 | Woodyard | Nov. 14, 1950 |
| 2,561,411 | Pfann | July 24, 1951 |
| 2,576,267 | Scaff et al. | Nov. 27, 1951 |
| 2,602,763 | Scaff et al. | July 8, 1952 |
| 2,603,693 | Kircher | July 15, 1952 |
| 2,610,386 | Saslaw | Sept. 16, 1952 |
| 2,644,852 | Dunlap | July 7, 1953 |
| 2,697,269 | Fuller | Dec. 21, 1954 |
| 2,701,326 | Pfann et al. | Feb. 1, 1955 |

FOREIGN PATENTS

| | | |
|---|---|---|
| 62,048 | Netherlands | Nov. 15, 1948 |